Figure 1:
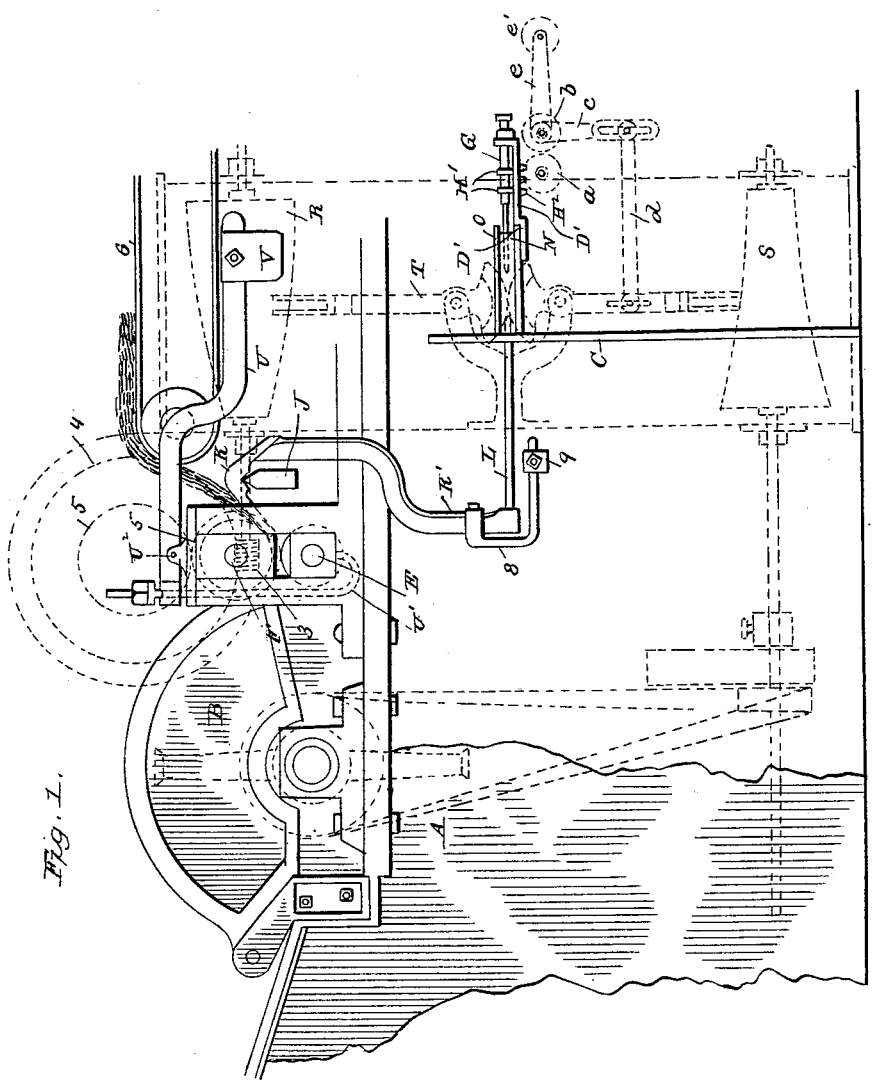

(No Model.)

J. C. POTTER.
EVENING MECHANISM FOR COTTON OPENERS, &c.

No. 386,756. Patented July 24, 1888.

WITNESSES,
Edwin L. Yewell,
Marvin A. Custis.

INVENTOR,
Jas. C. Potter.
by Marcellus Bailey,
his Attorney.

UNITED STATES PATENT OFFICE.

JAMES C. POTTER, OF PAWTUCKET, RHODE ISLAND.

EVENING MECHANISM FOR COTTON-OPENERS, &c.

SPECIFICATION forming part of Letters Patent No. 386,756, dated July 24, 1888.

Application filed March 8, 1888. Serial No. 266,512. (No model.)

*To all whom it may concern:*

Be it known that I, JAMES C. POTTER, of Pawtucket, in the State of Rhode Island, have invented certain new and useful Improvements in Evening Mechanism for Cotton-Openers and other Engines or Machines for Working Cotton and other Fibrous Materials, of which the following is a specification.

My invention relates to that kind of evening mechanism for cotton-openers, lappers, and the like, in which a power-driven evener-roll is combined with pivoted or hinged evener-plates, the movement of which (due to variations or irregularities in the material which passes between said roll and plates) is availed of to shift, through the intermediary of suitable mechanism, the belt on the cone-drums for the purpose of regulating the feed.

In the practical operation of a mechanism of this kind as ordinarily constructed the cotton sheet passes between two surfaces—that of the rotating evener-roll above and that of the evener-plates below. The result as concerns the cotton is what may be termed a "crimping" operation—that is to say, the plates act in some sort as a drag or holdback on that face of the cotton sheet which is in contact with them, so that the latter will travel more slowly than that face which is in contact and moves with the power-driven evener-roll, and the effect of all this is that the cotton sheet becomes crimped, distorted, and disorganized. Nor is this difficulty remedied by the employment of the feed-rolls which are usually interposed between the evener and the beater. There must necessarily intervene a considerable distance between the points where the material leaves the bite of the evener and where it enters the bite of the feed-rolls, and the latter therefore are practically powerless to help the cotton over the evener-plates, the consequence being that the sheet, from the causes above referred to, goes to the beater in imperfect condition, thereby producing uneven laps.

To afford the assistance to the sheet needed to properly help it along over the evener-plates, so as to neutralize the dragging or "holdback" action of the latter I have found it necessary to take hold of and to feed along the sheet immediately upon its quitting the evener-plates, to which end I combine with the evener-roll and the evener-plates a feed-roll, located between the evener-plates and the beater and as near to the bite of the evener-plates as practicable, said roll co-operating with the evener-roll to take hold of and feed along the cotton sheet as it leaves the evener-plates. It is in this feature that my invention mainly is comprised. The evener-roll in fact has a twofold function: it acts in conjunction with the evener-plates in its ordinary capacity, and, in conjunction with the feed-roll, as one of two feed-rolls directly into the bite of which the cotton is delivered immediately upon its leaving the evener-plates.

The nature of my improvements and the manner in which the same are or may be carried into effect will be readily understood by reference to the accompanying drawings, in which—

Figure 2:
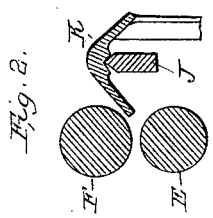

Figure 1 represents in side elevation so much of a cotton-opener as needed for the purposes of explanation, a portion of the frame being broken away to expose the working parts to view. Fig. 2 is a detail sectional view of the rolls and evener-plates.

A is the frame of the machine.

B is the beater.

F is the combined evener and feed-roll.

E is the feed-roll, which co-operates with roll F for feeding purposes.

K are the evener-plates, which co-operate with roll F for evening purposes.

J is the knife-edge bar or rod on which the evener-plates are fulcrumed.

The evener-plates can transmit their movement to the belt-shipper through the intermediary of any suitable mechanism. That which I have shown in the drawings for such purpose is a mechanism similar to that illustrated in my Letters Patent, No. 375,301, of December 20, 1887. That portion of said mechanism between the weighted fulcrum-slide G and the cone-drums (including the drums themselves) is represented in dotted lines. The lower cone-drum, S, is driven from the beater-shaft, as usual. The upper cone-drum, R, derives its movement from the lower one, S, through belting controlled by the shipper T. The combined evener and feed-roll F is power-driven, and derives its movement from a worm, 3, on the shaft of cone-drum R, through worm-wheel 4 and gears 5 5. The feed-apron 6 is driven, as usual, through gearing from the worm-wheel 4. Such driving-gearing is well known, and requires no illustration.

Confining attention for the present to the evener-plates K and the two rolls E F, it will be noted that the feed-roll E is below the evener-roll F, and is between the evener-plates K and the beater B. The roll F is mounted in fixed bearings. The roll E is mounted in movable bearings, so that it may move to and from its fellow roll F, and is held up against the latter with a yielding and (preferably) adjustable pressure, for which latter purpose various devices may be employed. The devices shown in the drawings consist of hook-rods U', adapted to take under the journals of the roll E or under the movable boxes for the same, and taking a bearing at their upper ends upon the shorter arms of levers U, (or upon a cross-bar connecting the said arms of the two levers, which levers are arranged one at each end of the roll,) each fulcrumed at $U^2$ to the frame of the machine, and having on their longer arms sliding adjustable weights V. In this way the feed-roll E is held up against its fellow roll F with any degree of pressure required, and is driven therefrom, although, if desired, it may be positively geared to the roll F. This, however, I have not found to be essential in practice.

As regards the arrangement and location of the evener-plates K, it will be noted that they are above the plane of meeting of the two rolls E F and stand at an oblique angle to said plane. While the position of the plates manifestly can be varied, nevertheless I find in practice that on the whole the best results are attained by placing them in the position shown in the drawings and first above indicated, because thereby the rolls are located in proper position with respect to the beater and the bite of the rolls is brought as near as may be to the end of the evener-plates.

Inasmuch as the mechanism for transmitting movement from the evener-plates to the cone-drum belt-shipper is substantially that shown in my Letters Patent No. 375,301, hereinbefore alluded to, the evener-plates are formed as angle or elbow levers having their longer and vertical arms arranged to bear at their lower ends each against its appropriate horizontal scale-lever connecting-rod L, which at its other end bears against its appropriate scale-lever of the scale-lever system contained in the box N, having a flanged cover, O, and attached to and supported by the vertical cross-partition C. These connecting-rods L are pointed at each end and enter sockets formed for them in the scale-levers and in the arms K'. Bracket-arms 8, secured to the arms K' and provided with adjustable weights 9, tend to move the arms K' in a direction to keep the plates K pressed against the cotton passing between them and the evener-roll F.

G is the slide rod, which constitutes the fulcrum for the main scale-lever of the scale-lever system.

D' is the bracket fixed to the floor or box N, furnishing a bearing for the outer end of the said rod.

$H^2$ is the rack-bar, mounted and adapted to slide in bracket D'.

H' are the internally-screw-threaded sleeves of rack-bar $H^2$, through which the corresponding externally-screw-threaded stem of rod G passes. The arrangement of these parts is similar to that of the like lettered parts in my aforesaid Letters Patent No. 375,301, and requires no further explanation.

Rack-bar $H^2$ gears with pinion $a$. The latter gears with and drives a like pinion, $b$, both of the pinions being mounted in suitable bearings in the frame. Fixed on the hub of pinion $b$ are two arms, $c\ e$. Arm $e$ is weighted at $e'$, and tends to rotate gear $b$ in a direction to keep the slide G pressed against the scale-lever system. Arm $c$ is jointed to a connecting-rod, $d$, the other end of which is jointed to one of the toothed quadrant levers which constitute the belt-shipper T, said levers engaging one another and having belt-shipping forks at their outer ends, as usual.

When the machine is in operation, the cotton, as it is delivered from the feed-apron, passes along between the evener-roll and evener-plates, and the latter by their movement operate the feed-regulating mechanism in the customary way. Immediately after passing the evener-plates the cotton is taken in the bite of the feed-roll E and the roll F, and is by them drawn along positively and with even motion, the draft of the lower roll, E, at this point upon the cotton offsetting and neutralizing the tendency to drag, which it would otherwise have, upon that one of its faces which passes over and in contact with the evener-plates, and thus preventing the crimping and consequent unevenness of the sheet.

Having described my improvements and the manner in which the same are or may be carried into effect, what I claim herein as new and of my own invention is as follows:

1. The combination, with the evener-plates and the feed-roll, of a combined evener and feed-roll, arranged and adapted to co-operate both with said feed-roll and with said evener-plates, substantially as and for the purposes hereinbefore set forth.

2. The combination of the evener-roll, the feed-roll placed beneath the evener-roll, means for holding up said feed-roll against the same with yielding pressure, and the evener-plates placed above and obliquely to the plane of meeting of the two rolls, as described, the arrangement being such that the cotton passes first between the evener-plates and the evener-roll, and thence between the last-mentioned roll and the feed-roll, substantially as and for the purposes hereinbefore set forth.

3. The combination, with the beater, the evener-plates, the cone-drums, and belt-shipper therefor, and mechanism whereby the said belt-shipper is operated from the evener-plates, of the evener-roll and the feed-roll located between the beater and the evener-plates, and arranged and adapted to co-operate with each other and with the evener-plates, substantially in the manner and for the purposes hereinbefore set forth.

4. The combination, with the roll F, supported in fixed bearings and evening devices co-operating therewith, of the feed-roll E, supported in movable bearings below the roll F, and means whereby said feed-roll is held up against the said roll F with yielding pressure, substantially as and for the purposes hereinbefore set forth.

In testimony whereof I have hereunto set my hand this 22d day of February, 1888.

JAMES C. POTTER.

Witnesses:
W. W. BLODGETT,
A. T. ATHERTON.